Oct. 29, 1957 L. MOLLENBERG 2,811,656
COMBINATION FAN AND CENTRIFUGAL MECHANISM FOR ELECTRIC MOTOR
Filed Oct. 31, 1956
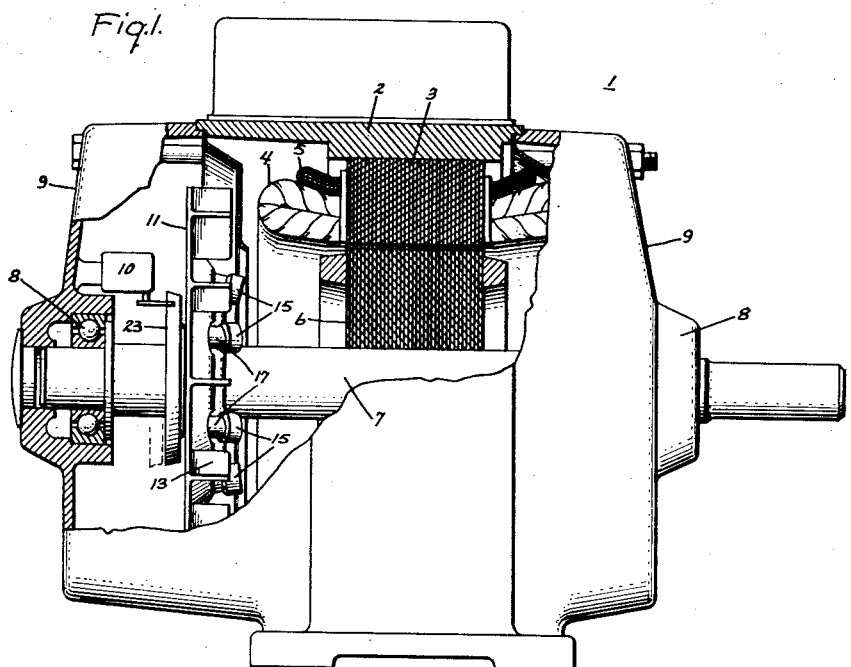
Inventor:
Leroy Mollenberg,
by Robert G. Irish
His Attorney.

United States Patent Office 2,811,656
Patented Oct. 29, 1957

2,811,656

COMBINATION FAN AND CENTRIFUGAL MECHANISM FOR ELECTRIC MOTOR

Leroy Mollenberg, Fort Wayne, Ind., assignor to General Electric Company, a corporation of New York Application October 31, 1956, Serial No. 619,589

2 Claims. (Cl. 310—60)

This invention relates to dynamoelectric machines, and more particularly to single-phase fan-cooled electric motors wherein centrifugal means are used to open the starting winding.

There is a constant effort in process, in the field of electric motors, to decrease both the size and the cost of the motor without impairing its performance in any way. In motors which require fan cooling and which are started by a starting winding which is subsequently removed by a centrifugal mechanism, it has been the custom to consider the fan and the centrifugal mechanism as entirely separate parts; however closely they may have been located physically, they were nonetheless not combined into a single structure in any sense of the word. This has caused some duplication of parts and has often resulted in some additional length being required for the motor since most constructions require that both devices be secured to the shaft and thus provide for some axial separation of the two.

It is an object of this invention to provide a construction wherein the centrifugal mechanism and the fan are combined into one integral structure so that duplication of parts may be eliminated, thereby economizing on the construction and eliminating some axial length from the motor in which the combination is used.

In one aspect, the invention provides, in a fan-cooled single-phase electric motor, a rotatable shaft with a fan having a substantially radially extending plate member secured thereto. A plurality of fan blades is supported on the plate member in the usual manner; in addition the plate member has at least one additional opening formed therein. A centrifugal mechanism is combined with the fan in that it includes at least one weight member which is pivotably mounted in the opening in the plate member. Biasing means are secured to the weight member so as to bias it to a first position; in the usual manner, the weight member is arranged to pivot to a second position when the centrifugal force acting thereon overcomes the biasing force. Thus, in effect, the hub portion of the fan plate also acts as the back plate of the centrifugal mechanism. While the two parts are indispensable to the two mechanisms respectively, they are nonetheless combined into a single entity wherein the same part serves both functions.

The features of the invention which are believed to be novel are set forth with particularity in the appended claims. The invention itself, however, together with further objects and advantages thereof may best be understood by reference to the following description taken in connection with the accompanying drawing.

In the drawing,

Figure 1 is a side view, partly in cross section, of a single-phase fan-cooled electric motor incorporating the improved combination of this invention;

Figure 2 is a side view, partly in cross section, of the improved combination; and Figure 3 is an exploded view in perspective illustrating the various parts of the improved combination.

Referring first to Figure 1 of the drawing, there is shown a motor, generally indicated at 1, having a housing 2 which supports a stator core 3 in which are wound a main winding 4 and a starting winding 5. A rotor member 6 is positioned within stator core 3 and includes a shaft 7 which is rotatably supported at each end in bearings 8 provided in end shields 9 which cooperate with housing shell 2 to form the motor enclosure. The motor is of the type which starts with both windings 4 and 5 connected in parallel, as is well understood in the art and therefore not illustrated. At a predetermined speed, a switch mechanism 10 is actuated, as will be more fully described below, to open the circuit to winding 5 and the motor continues to run on winding 4 alone. It will be understood that the construction described thus far is purely for the purpose of illustrating a single-phase motor having a starting winding disconnected for running operation, and that the various details thereof which appear and may be described are merely incidental.

Referring now to all the figures of the drawing, the novel construction will be described. A substantially plate shaped member 11 is provided with a hub portion 12 which is secured over shaft 7, as by pressing, so as to be rigid therewith. Plate 11 supports a plurality of circumferentially spaced fan blades 13 adjacent its outer periphery. The fan blades are so formed that upon rotation of shaft 7 they will stir the air in a conventional and well known manner so as to effect ventilation of the motor 1. A plurality of openings 14 are provided in plate 11. While the openings are preferably equispaced and located radially inwardly of fan blades 13, as shown, the essential feature is that they be so positioned that the centrifugal mechanism which is to be described will not interfere with fan blades 13 during its operation.

A plurality of weight members 15 include portions 16 which extend through openings 14 in pivotable relation therewith. Preferably, each weight 15 is provided with a grommet 17 of relatively soft material which has a groove 18 so that the pivoting of the weight 15 in opening 14 is cushioned by engagement of the grommet 17 with recess 22 upon movement of the weight to its extreme position in either direction. Each weight 15 is secured at one end thereof to an annulus 19 of spring material which includes inwardly extending arms 20. The end 21 of each arm 20 is secured within a recess 22 formed on a collar 23 having an opening 24 so as to be mountable over shaft 7.

Annulus 19 biases weights 15 to the position best shown in Figures 1 and 2, with the result that collar 23 is positioned as shown in engagement with switch 10 so as to complete the circuit to winding 5. When motor 1 starts, a centrifugal force is exerted on the weights 15 which increases with the speed of rotation. As the speed of rotation becomes greater, the centrifugal force finally overcomes the biasing effect of spring annulus 19 and causes weights 15 to snap to a radially outward position from their previous position, as shown in phantom in Figure 2. This movement of the weights causes spring annulus 19 to be snapped into a substantially dish-shaped configuration, as shown in phantom at 19 in Figure 2. This in turn causes movement of arms 20 and collar 23 to the position shown in phantom at 23 in Figure 2, thus removing the collar from contact with switch 10 and thereby opening winding 5. Motor 1 now runs on winding 4 alone. When the motor is shut off, the speed of rotation decreases to the point where the bias of the spring annulus 19 overcomes the centrifugal force acting on weights 15 and the spring snaps back to its position shown in solid outline in the Figures 1 and 2, with the result that the starting winding circuit is again completed through switch 10.

It will be observed that plate 11 serves both as a support for fan blades 13 and as a back plate for the pivotable weights 15. Since, formerly, these two items were provided separately, even though in many cases they were in close physical proximity to each other in the same motor, it will be readily apparent that the invention provides a combined structure wherein two previously independent items have been combined with the consequent elimination of one now unnecessary part without any impairment of the operation of either; in addition there is a savings in the axial length along shaft 7.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In a fan-cooled single-phase motor, a rotatable shaft; a fan including a substantially radially extending plate member and a plurality of blades supported thereon, said plate member being rigidly secured to said shaft and having at least one opening formed therein; and a centrifugal mechanism including at least one weight member pivotably mounted on said plate member in said opening, and means secured to said weight member biasing the same to a first position, said weight member being arranged to pivot to a second position when the centrifugal force thereon overcomes the biasing force.

2. In a fan-cooled single-phase motor, a rotatable shaft; a fan including a substantially radially extending plate member and a plurality of blades supported thereon adjacent the periphery thereof, said plate member being rigidly secured to said shaft and having a plurality of equispaced openings formed therein radially inwardly of said blades; and a centrifugal mechanism including a plurality of weight members respectively pivotally mounted on said plate in said openings, and spring means secured to said weight members biasing the same to a first position radially inwardly toward said shaft, said weight members being arranged to pivot to a second position radially away from said shaft when the centrifugal force thereon overcomes the biasing force.

No references cited.